United States Patent Office 2,891,877
Patented June 23, 1959

2,891,877

FLAME RESISTANT ORGANIC TEXTILES AND METHOD OF PRODUCTION

Leon H. Chance, George L. Drake, Jr., and Wilson A. Reeves, New Orleans, La., assignors to the United States of America as represented by the Secretary of Agriculture No Drawing. Original application June 5, 1956, Serial No. 589,560. Divided and this application April 24, 1957, Serial No. 661,556

9 Claims. (Cl. 117—136)

(Granted under Title 35, U.S. Code (1952), sec. 266)

A non-exclusive, irrevocable, royalty-free license in the invention herein described, throughout the world, for all purposes of the United States Government, with the power to grant sublicenses for such purposes, is hereby granted to the Government of the United States of America.

This invention relates to new phosphorus and nitrogen containing polymers, processes for their production and processes of employing these polymers in the flameproofing of certain organic fibrous materials.

This application is a division of Serial No. 589,560 filed June 5, 1956.

In general, this invention relates to polymers capable of being produced by heating a poly(1-aziridinyl)phosphine oxide or sulfide (e.g. a compound that contains at least two 1-aziridinyl groups

attached to pentavalent phosphorus).

We have discovered that compounds that contain at least two 1-aziridinyl groups attached to pentavalent phosphorus atoms polymerize when heated in the presence of trace quantities of water to produce polymers. Such polymers contain the characteristic reoccurring connecting structure

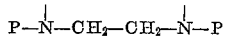

wherein the phosphorus atoms are pentavalent.

Such polymers can be produced in the form of solid synthetic resins. They can be deposited on the surfaces and/or in the interstices of hydrophilic fibrous organic materials, i.e., organic materials which absorb or adsorb water. When such resins are deposited, they reduce the combustibility of hydrophilic fibrous organic materials and resist removal by laundering and the like chemical treatments. Such resins can be deposited on the surfaces of non-hydrophilic materials to form flame resistant coatings.

1-aziridinyl phosphine oxides or sulfides suitable for use in this invention are compounds which contain at least two 1-aziridinyl groups, $(CH_2)_2N$—, attached to pentavalent phosphorus atoms. The compounds used in this invention may be represented by the following structure:

wherein

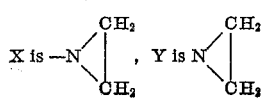

or a dialkyl amine group such as

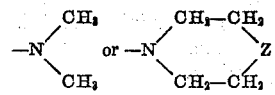

and where Z is oxygen or sulfur. The aziridinyl compounds can be prepared by substantially any of the known processes for producing such compounds. In general, they are prepared by reacting ethylenimine or alkyl substituted ethylenimines with the corresponding phosphorus halide. The preparation of tris(1-aziridinyl)phosphine oxide, $[(CH_2)_2N]_3PO$, has been described by Bestian and coworkers [Bestian et al., Ann. 566, 210–244 (1950)].

Polymers provided by this invention can be produced in acidic, neutral, and alkaline conditions. They can be produced in the form of liquids or solids and can be molded by the conventional techniques of molding thermosetting resins but are more easily produced in the form of films. These polymers are valuable materials for use in production of molded synthetic articles, such as buttons, electrical insulators and the like; synthetic coatings such as protective coatings having reduced flammability; paper treating resins; textile resins; and the like having reduced flammability.

The polymers provided by this invention are preferably prepared by gently heating an aqueous solution of the aziridinyl phosphine oxide or sulfide in about neutral or slightly alkaline conditions until polymerization occurs.

The combustibility of organic fibrous materials can be reduced in accordance with this invention by impregnating the fibrous materials with an aqueous solution, or uniform suspension or dispersion, of the monomeric compounds, or the partially polymerized monomers formed by reacting the monomeric compounds until partial polymerization occurs and curing the impregnated materials at the temperatures conventionally used for curing fibrous organic materials.

Surface active agents, water repellents, and other textile treating agents may be incorporated into the aqueous or emulsion treating media to modify the treated textiles. Surface active softening agents improve tear strength of cotton and rayon fabrics.

The process of this invention can be used to reduce the combustibility of substantially any hydrophilic fibrous material such as cotton, rayon such as viscose rayon, ramie, jute, wool, paper, cardboard and the like materials which can be impregnated with a liquid and dried or cured. When the resins are applied to cellulosic materials, some cross linking occurs with the cellulosic hydroxyl groups. In the case of cotton textiles the cross linking causes a loss in tear and tensile strength.

Where a textile is being impregnated, it is of advantage to remove excess impregnating liquor by passing the textile through squeeze rolls prior to drying or curing the impregnated textile. It is also advantageous to dry the textile at about 70° to 110° C. before it is cured at a temperature of from about 100° to 170° C.

The degree of flame resistance imparted to a textile by these phosphorus and nitrogen containing resins can be varied from a low degree to a very high degree by varying the amount of polymer put in the textile.

Some advantages of flameprofing textiles in accordance with this invention are: textiles treated by this process are flame resistant, glow resistant, shrink resistant, and rot and mildew resistant; the effects of the treatment are permanent, and resistant to laundering, dry cleaning, and boiling alkali solutions; treated textiles are made highly flame resistant with relatively small amounts of the phosphorus and nitrogen containing polymers.

The following examples illustrate this invention. The flame test used in evaluating the fabrics in this invention was the standard vertical flame test as specified in Federal Specification CCC-T-191b. The test for permanency of the flame resistant agent was that of boiling for 3 hours in an aqueous solution containing 0.5% laundry soap and 0.2% sodium carbonate. In the example, the term "part" refers to parts by weight.

*Example 1*

Six parts of tris(1-aziridinyl)phosphine oxide were heated at 140° C. for 40 minutes. A clear hard polymer containing nitrogen and phosphorus was formed which was insoluble in boiling water, benzene, acetone, and tetrachloroethylene.

*Example 2*

A solution consisting of one part tris(1-aziridinyl)phosphine oxide, one part water, and 0.1 part triethanolamine (as a basic catalyst) was heated on a steam cone for 30 minutes, and then at 140° C. for 10 minutes. A clear hard polymer containing nitrogen and phosphorus was formed which was insoluble in boiling water, benzene, acetone, and tetrachloroethylene. It adhered to glass very well.

A polymer was formed in a similar manner using 0.2 part of 18% hydrochloric acid as a catalyst instead of a base. The water was evaporated in a vacuum and the polymer heated for one hour on a steam cone and cured for 30 minutes at 110° C.

*Example 3*

An aqueous solution with a pH of 9.4 was prepared containing 25% tris(1-aziridinyl)phosphine oxide, 4% triethanolamine, and 2% cationic softener. The solution was applied to 8.2 oz. cotton twill in a padder to give 65% wet pick-up. The fabric was dried for 3 minutes at 85° C. and then cut into four pieces and each portion was heated at a given temperature. After curing, the samples were washed in running hot water for 30 minutes. The results obtained on the samples heated at various temperatures are shown in the table below.

| Curing Temp., ° C. | Resin Add-on, percent | Char Length (inches) |
|---|---|---|
| 120 | 3.3 | [1] BEL |
| 130 | 6.3 | [1] BEL |
| 140 | 9.3 | 3.4 |
| 150 | 11.1 | 4.1 |

[1] BEL=Burned entire length of 10-inch sample.

From the table above it is seen that the percent "add-on" increases with the curing temperature. The samples cured within the range of 140–150° C. showed excellent flame resistance and no afterglow, and lost very little of their original flame resistance after boiling for three hours in a solution of soap and sodium carbonate. Fabric cured at 140° C. lost only 9–10% of its phosphorus and nitrogen after a 3-hour soap-sodium carbonate boil. The hand and appearance of the fabric were substantially unaltered.

*Example 4*

An aqueous solution with a pH of 6.4 was prepared containing 25% tris(1-aziridinyl)phosphine oxide, 2.0% cationic softener, 3.0% acetic acid, 4.1% sodium acetate, and 66% water. This solution was used to treat 8 oz. cotton twill fabric as described in Example 3. Samples of the treated cotton twill that were cured at 150° C. contained 12% resin and had a char length of 3.8 inches.

*Example 5*

A sample of 8.2 oz. cotton twill was padded through a solution containing 15% tris(1-aziridinyl)phosphine sulfide, 15% tris(1-aziridinyl)phosphine oxide, 4% triethanolamine and 66% $H_2O$. The fabric was given two dips and two nips using a very tight squeeze roll pressure. The sample was dried for 4 minutes at 80–90° C. and cured for 5 minutes at 140° C. using a forced draft oven for both the dry and cure. The fabric was washed and dried. Resin add-on of copolymer was 11.8%.

The treated fabric was flame resistant and glow resistant.

We claim:

1. A process for rendering a hydrophilic fibrous organic material flame resistant which comprises impregnating said fibrous material with a homogeneous aqueous composition containing the partial polymerization product of a compound selected from the group consisting of tris(1-aziridinyl)phosphine oxide, tris(1-aziridinyl)phosphine sulfide, and mixtures thereof and then heating the impregnated fibrous material to complete polymerization.

2. A process for reducing the flammability of a cellulosic textile material which comprises impregnating the textile material with an aqueous solution of a compound selected from the group consisting of tris(1-aziridinyl)phosphine oxide, tris(1-aziridinyl)phosphine sulfide, and mixtures thereof, drying the impregnated material, and then heating the dried material to a temperature of about 100° C. to about 160° C. for a period of about 2 to about 10 minutes to polymerize the compound, the longer time being used with the lower temperature.

3. The process of claim 2 in which the textile material is impregnated with an aqueous solution of tris(1-aziridinyl)phosphine oxide.

4. The process of claim 2 in which the textile material is impregnated with an aqueous solution of tris(1-aziridinyl)phosphine sulfide.

5. The process of claim 2 in which the textile material is impregnated with an aqueous solution of a mixture of tris(1-aziridinyl)phosphine oxide and tris(1-aziridinyl)phosphine sulfide.

6. A flame resistant, glow resistant, mildew and rot resistant, shrink resistant textile comprising a hydrophilic fibrous organic textile impregnated with a resin selected from the group consisting of a polymer of tris(1-aziridinyl)phosphine oxide, tris(1-aziridinyl)phosphine sulfide, and copolymers of tris(1-aziridinyl)phosphine oxide and tris(1-aziridinyl)phosphine sulfide.

7. The textile of claim 6 in which the resin is a polymer of tris(1-aziridinyl)phosphine oxide.

8. The textile of claim 6 in which the resin is a polymer of tris(1-aziridinyl)phosphine sulfide.

9. The textile of claim 6 in which the resin is a copolymer of tris(1-aziridinyl)phosphine oxide and tris(1-aziridinyl)phosphine sulfide.

References Cited in the file of this patent

UNITED STATES PATENTS

| 2,606,901 | Parker et al. | Aug. 12, 1952 |
| 2,654,738 | Lecher et al. | Oct. 6, 1953 |
| 2,672,459 | Kuh et al. | Mar. 16, 1954 |
| 2,781,281 | Berger | Feb. 12, 1957 |